US006584687B1

(12) United States Patent
Yamamoto et al.

(10) Patent No.: US 6,584,687 B1
(45) **Date of Patent: *Jul. 1, 2003**

(54) METHOD OF MANUFACTURING AN INK-JET RECORDING HEAD USING A THERMALLY FUSIBLE FILM THAT DOES NOT CLOSE COMMUNICATION HOLES

(75) Inventors: Yoshikatsu Yamamoto, Nagano (JP); Takaichi Wada, Nagano (JP); Nagamitsu Takashima, Nagano (JP); Motonori Okumura, Nagano (JP); Kazuhiko Hara, Nagano (JP); Yuji Tanaka, Nagano (JP); Takahiro Katakura, Nagano (JP); Kohji Watanabe, Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,950

(22) Filed: Dec. 11, 1997

Related U.S. Application Data

(62) Division of application No. 08/575,869, filed on Dec. 20, 1995, now Pat. No. 5,872,583.

(30) Foreign Application Priority Data

| | | |
|---|---|---|
| Dec. 21, 1994 | (JP) | 6-335619 |
| May 23, 1995 | (JP) | 7-148291 |
| Nov. 13, 1995 | (JP) | 7-318635 |

(51) Int. Cl.[7] .......................... B21D 53/76; C03B 29/00

(52) U.S. Cl. ................. 29/890.1; 29/25.35; 29/DIG. 1; 156/89.12; 156/244.22

(58) Field of Search ................................ 29/890.1, 878, 29/880, 25.35, 611, DIG. 1; 156/89.12, 89.16, 244.22, 273.3; 347/70, 71, 20, 40, 68

(56) References Cited

U.S. PATENT DOCUMENTS 4,064,311 A * 12/1977 McLean et al. .......... 156/89.16

(List continued on next page.)

FOREIGN PATENT DOCUMENTS

EP A1 0427291 5/1991

(List continued on next page.)

OTHER PUBLICATIONS

Lin et al, Finite element Analysis on Deflection Control of Plates with Piezoelectric Actuators, Composite Structures, vol. 35, Issue 4, pp. 423–433, Aug. 1996.*

Patent Abstracts of Japan, Jun. 1983, JP–58–108160A (Ricoh, K.K.).

*Primary Examiner*—A. Dexter Tugbang
(74) *Attorney, Agent, or Firm*—Sughrue Mion, PLLC

(57) ABSTRACT

A method of manufacturing an ink-jety recording head in which an ink supply port forming substrate 21, a common ink chamber forming substrate 25, and a nozzle plate 27 are bonded together by inserting between them thermally fusible films 31 and 32 respectively, in which are formed through holes 45 and 45 at two or more positions, and by also filling the film through holes with an adhesive that is mixed with a gap material G for adjusting the thicknesses of the thermally fusible films when they are fused, so as to form a flow path unit 30; and then the flow path unit 30 and the actuator units 1 are bonded together by inserting between them a thermally fusible film 33, in which are through holes 64 at two or more positions, and by also filling the through holes with an adhesive that is mixed with a gap material G for adjusting the thickness of the thermally fusible film when it is fused.

19 Claims, 10 Drawing Sheets

U.S. PATENT DOCUMENTS

| | | | | | |
|---|---|---|---|---|---|
| 4,806,188 | A | * | 2/1989 | Rellick | 156/89.12 |
| 4,991,283 | A | * | 2/1991 | Johnson et al. | 156/89.12 |
| 5,387,474 | A | * | 2/1995 | Mikeska et al. | 156/89.12 |
| 5,448,826 | A | * | 9/1995 | Goetz et al. | 156/89.12 |
| 5,489,930 | A | * | 2/1996 | Anderson | 29/890.1 |
| 5,505,364 | A | | 4/1996 | Plesinger | 228/121 |
| 5,718,044 | A | * | 2/1998 | Baughman et al. | 29/890.1 |

FOREIGN PATENT DOCUMENTS

| | | | | |
|---|---|---|---|---|
| EP | 528440 | | 2/1993 | |
| EP | A1 0528440 | | 2/1993 | |
| EP | 554912 | * | 8/1993 | 29/890.1 |
| EP | 584823 | | 3/1994 | |
| EP | A2 0600743 | | 6/1994 | |
| EP | 659562 | | 6/1995 | |
| JP | 2-102056 | * | 4/1990 | 29/890.1 |
| JP | 3-216342 | * | 9/1991 | 29/890.1 |
| JP | 91-357860 | * | 10/1991 | 29/890.1 |
| JP | 5-220966 | * | 8/1993 | 29/890.1 |
| JP | 640035 | | 2/1994 | |

* cited by examiner

METHOD OF MANUFACTURING AN INK-JET RECORDING HEAD USING A THERMALLY FUSIBLE FILM THAT DOES NOT CLOSE COMMUNICATION HOLES

This is a divisional of Application Ser. No. 08/575,869 filed Dec. 20, 1995, U.S. Pat. No. 5,872,583.

BACKGROUND OF THE INVENTION

1. Field of the Invention

The present invention relates to a laminated ink-jet recording head that includes an actuator unit, which is formed of ceramics, and a flow path substrate, which is formed of metal, that are connected to each other.

2. Related Art

In Japanese Unexamined Patent Publication No. Hei 6-040035, an ink-jet recording head is disclosed in which a piezoelectric vibration plate is bonded to an area of an elastic plate to form a pressure generation chamber, and in which to generate ink drops, the volume of the pressure generation chamber is varied by the flexing displacement of the piezoelectric vibration plate. This recording head is characterized in that it is able to generate ink drops stably because of the wide area of the pressure generation chamber that is variable.

In a recording head of this type, normally, an actuator unit, which is formed of ceramics and which includes a pressure generation chamber, a vibration plate and a piezoelectric vibration plate, is fixed by a bonding layer to a single flow path forming unit, which is made of a metal plate and which is so formed as to correspond to a plurality of nozzle openings which are formed in lines.

For such bonding, an adhesive, for example, can be used. However, when an adhesive is used, some accompanying problems arise. For example, the adhesive is not only difficult to apply, but it also may flow into and seal the nozzle openings and a lot of time is required for the adhesive to harden.

On the other hand, to solve these problems, and in particular, to simplify the application operation and to shorten the hardening time, a thermally fusible film is also used for such bonding. In this case as well, however, when pressure is applied to the thermally fusible film during the bonding operation, the thermally fusible film can be compressed and flattened to an unnecessary extent so that bonding layer thicknesses vary, or the film can flow into communication holes and close them. Further, there is a possibility that the thermally fusible film will now be sufficiently compressed and that a part of the film will be unevenly shaped. Then, when the unevenly shaped film is interposed between the substrates to bond them together, a sufficient bonding strength cannot be obtained.

SUMMARY OF THE INVENTION

The present invention is intended to eliminate the above problems that arise with a conventional ink-jet recording head. Accordingly, it is an object of the invention to provide a laminated ink-jet recording head which uses as bonding means a thermally fusible film that does not close communication holes and can provide a sufficient bonding strength.

It is also an object of the present invention to provide an ink-jet recording head that allows the components of the head to be securely bonded together by employing thermally fusible films.

In achieving the above object, according to the present invention, there is provided an ink-jet recording head, comprising:

an actuator unit, which includes a plurality of first cover members and spaces respectively formed of ceramics, the first cover members and the spacers being integrally bonded to each other, with each of the first cover members having mounted on one surface a plurality of piezoelectric vibration plates so as to provide a vibration means, and with one surface of each of the spacers being sealed by the first cover member so as to form a plurality of pressure generation chambers; and a flow path unit, which is bonded to the actuator unit, that includes: an ink supply port forming substrate formed of metal, to which the actuator unit can be fixed and which also includes a plurality of communication holes and a plurality of ink supply ports, formed respectively on the two side ends of the pressure generation chambers; a common ink chamber forming substrate, which is formed of metal, that includes a plurality of ink chambers, which respectively communicate with the pressure generation chambers through the ink supply ports, and a plurality of communication holes, which communicate with the pressure generation chambers; and a nozzle plate, which is formed of metal, that seals the other surface of the common ink chamber forming substrate and that includes a plurality of nozzle openings that are connected with the pressure generation chambers by the respective communication holes, wherein the ink supply port forming substrate, the common ink chamber forming substrate and the nozzle plate being bonded to each other by an adhesive so as to provide the flow path unit, and wherein the ink supply port forming substrate, the common ink chamber forming substrate and the nozzle plate are bonded together by inserting between them thermally fusible films, in each of which, film through holes are formed at two or more positions, and by also supplying, by means of the film through holes, an adhesive mixed with a gap material for adjusting the thickness of the thermally fusible films when they are fused, to provide the flow path unit, and then the flow path unit and the actuator unit are bonded together by inserting between them a thermally fusible film, in which through holes are formed at two or more positions, and by an adhesive that is mixed with a gap material, with which the film through holes are filled, for adjusting the thickness of the thermally fusible film when it is fused.

According to the invention, an extruded quantity of thermally fusible film can be accepted by the through holes formed at important locations in the thermally fusible film, and the gap material with which the through holes in the film are filled prevents the unnecessary spreading of the thermally fusible film.

DETAILED DESCRIPTION OF THE PREFERRED EMBODIMENTS

Figure 1:
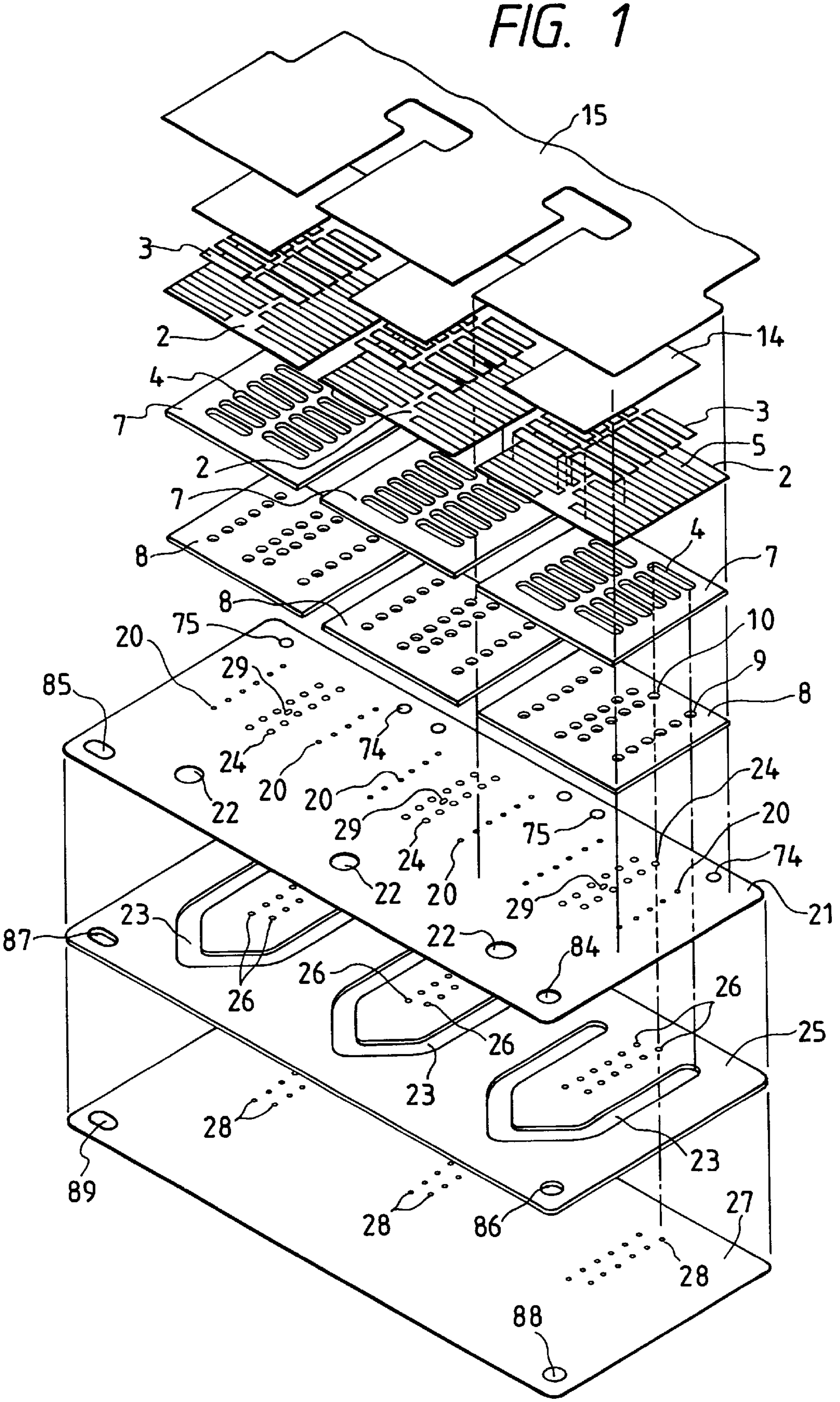
FIG. 1 is a perspective view of an embodiment of an ink-jet recording head according to the invention, showing how to assemble the components of the same.

Now, a detailed description will be given below of one embodiment of an ink-jet recording head, according to the present invention, while referring to the drawings.

Figure 2:
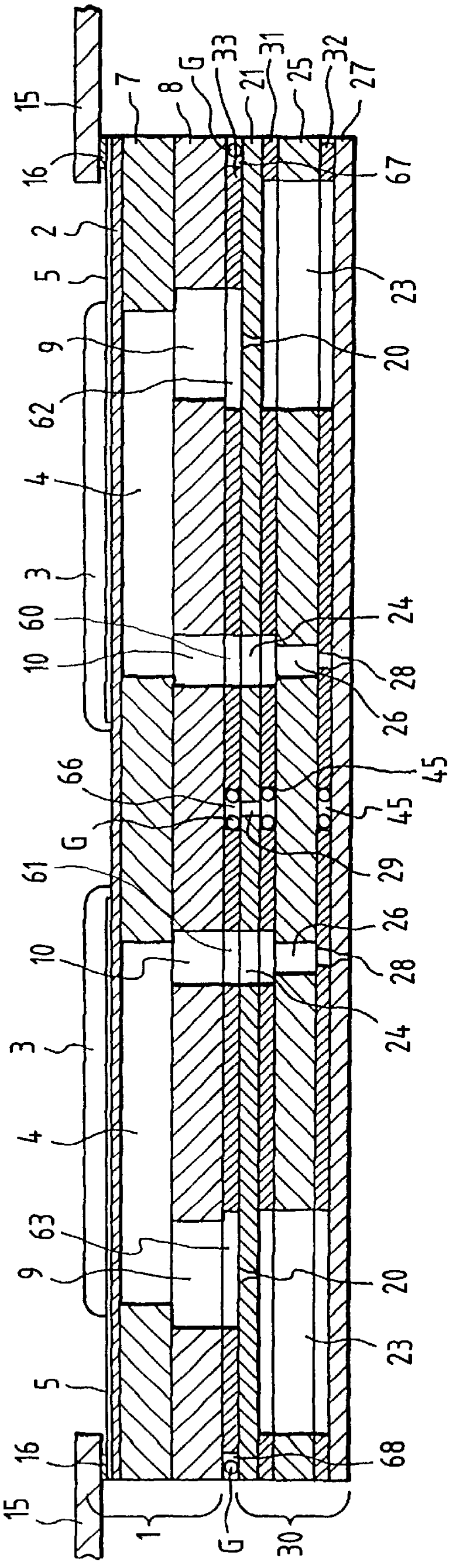
FIG. 2 is a cross sectional view of the structure of the portions of the embodiment that are located adjacent to the pressure generation chambers that are formed in one of the actuator units employed in the present embodiment.

FIG. 1 is a perspective view of a complete recording head assembly according to the present invention, with thermally fusible film omitted therefrom. FIG. 2 is a cross sectional view of the structure of a portion of the recording head situated near pressure generation chambers that are formed in one of actuator units. In these diagrams, reference number 2 denotes a first cover member, which is formed of a thin plate of zirconium and which has disposed on its surface drive electrodes 5 that are positioned opposite pressure generation chambers 4, which will be described later. Piezoelectric vibration plates 3 each of which is formed of PZT or the like, are fixed to the drive electrodes 5. If the piezoelectric vibration plate 3 are fixed and vibrated, then the pressure generation chambers can be contracted or expanded.

Reference number 7 is used to denote spacers, each of which can be formed by opening through holes in a plate formed of ceramics such as zirconium (ZrO2) that has a thickness, for example, 150 $\mu$m. that is suitable for forming the pressure generation chambers 4. The spacers are sealed at two surf aces by second cover members 8 (which will be discussed later) and the above-mentioned first cover members 2, so as to define the pressure generation chambers 4.

Reference number 8 is used to denote second cover members, each of which can be produced in a plate formed of ceramics, such as zirconium or the like, by opening up communication holes 9 for connecting ink supply ports 20 (which will be described later) with the pressure generation chambers 4, and communication holes 10 for connecting nozzle openings 28 with the other ends of the pressure generation chambers 4. The second cover members 8 are respectively fixed to the surfaces of the spacers 7.

These respective members 2, 7 and 8 are composed of clay-like ceramics that are formed into the respective given shapes. Following this, they are superimposed, one on top of another, and are baked, so that they can be fused together to produce an actuator unit 1 without an adhesive being used.

Reference number 21 denotes an ink supply port forming substrate, which also Fervor as a fixed substrate for the actuator unit 1. In the pressure generation chambers 4, at one side end, are ink supply ports 20, which connect common ink chambers 23 (which will be described later) with the pressure generation chambers 4, and, at the other side end, communication holes 24, which connect the pressure generation chambers 4 with nozzle openings 28. Further, at locations that are outside the area to which the actuator unit 1 is fixed, in the ink supply port forming substrate 21 are formed ink guide ports 22, 22, 22 into which ink can flow from an ink tank (not shown).

In the diagrams, reference number 29 is used to denote through holes for air deflation, which are opened at positions that are opposite windows 66 (FIG. 4) and which are formed along the center line of a thermally fusible film 33 that is used to fix the actuator unit 1 to the ink supply port forming substrate 21 (see FIG. 1). The through holes 29 are used to allow the air to escape that is expanded during the thermally fused fixing operation.

At locations on the ink supply port forming substrate 21 that are outside the flow path forming area, holes 74 and 75 are formed for positioning the substrate 21 with respect to the actuator units 1, 1, 1, and holes 84 and 85 for positioning the substrate 21 with respect not only to a common ink chamber forming substrate 25 and a nozzle plate 27, which respectively constitute a flow path unit 30, along with thermally fusible films 31 and 32 (which will be described later) that are used to bond them to one another.

Reference number 25 dentes a common ink chamber forming substrate, which consists of a plate member that is formed of stainless steel, or the like, having a thickness, for example, 150$\mu$m, that is suitable for formation of common ink chambers, and also having a corrosion resisting property. That is, the substrate 25 can be formed by opening, in the stainless steel plate, communication holes 26 for connecting through holes that correspond to the shapes of the common ink chambers 23 with the nozzle openings 28.

Also opened at locations on the common ink chamber forming substrate 25 that are outside the flow path forming area, are positioning holes 86 and 87.

Reference number 27 stands for a nozzle plate in which are formed, in the portion that is situated at one side of the pressure generation chambers 4, nozzle openings 28 that communicate with the respective pressure generation chambers 4, and positioning holes 88 and 89.

Between the ink supply port forming substrate 21, the common ink chamber forming substrate 25, and nozzle plate 27, thermally fusible films 31 and 32 (which will be described later) are so inserted and adhesives are so applied to necessary portions of these components that they are united into a flow path unit 30, as shown in FIG. 2.

A plurality of actuator units 1, in the present embodiment, three actuator units 1, are provided on the surface of the ink supply port forming substrate 21 of the flow path unit 30; the thermally fusible films 33 (which will be described later) are respectively inserted between the adjoining actuator units 1; and an adhesive formed of an epoxy-system synthetic resin that is mixed with a gap material, such as glass beads or the like, is applied to the necessary portions of these elements so as to unite them and constitute a recording head.

On the recording head, flexible cables 15 are connected to the drive electrodes 5 by means of soldered layers 16 that are disposed on the side ends of the recording head. In response to a drive signal received from an external drive circuit via the cables 15, ink droplets are ejected. In the diagram, reference number 14 is used to denote common electrodes which are formed on the surface of the piezoelectric vibration plate 3.

Figure 3:
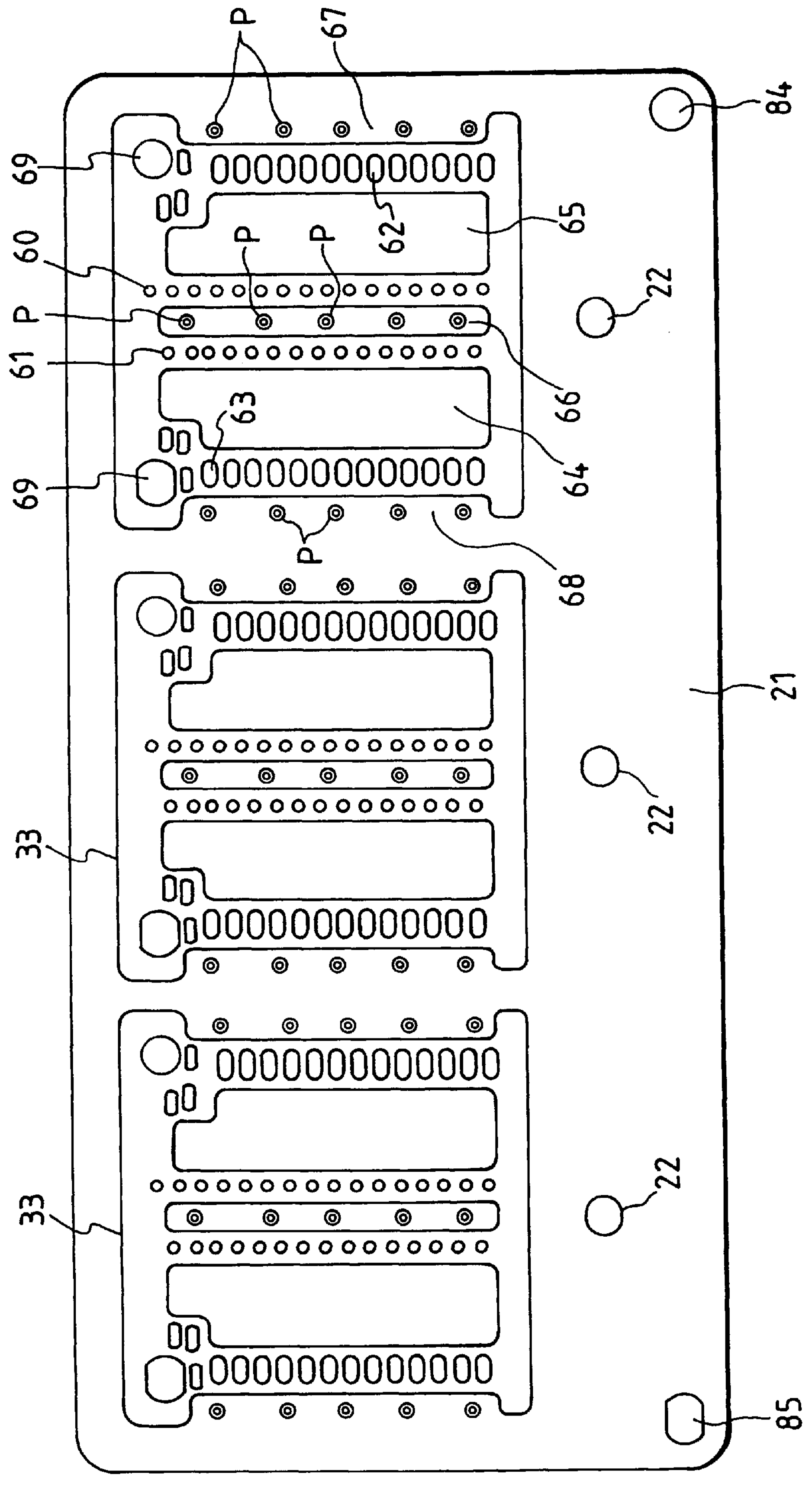
FIG. 3 is an illustration for an embodiment in which a thermally fusible film is employed for fixing a flow path unit and actuator units to each other, showing a state wherein the fusible film is disposed on an ink supply port forming substrate which constitutes a component of the flow path unit.

FIG. 3 shows an embodiment in which three thermally fusible films 33, for connecting the common flow path unit 30 with the actuator units 1, are provisionally bonded to the ink supply port forming substrate 21 of the flow path unit 30. The throe thermally fusible films 33 are identically structured and therefore a description for only one of the thermally fusible films 33 will be given here.

In the thermally fusible film 33, through holes 60 and 61 are opened at locations that are opposite the communication holes 10 that communicate with the nozzle openings 28. While through holes 62 and 63 are opened at locations that are opposite the communication holes 9 that communicate with the ink supply ports 20.

Also, windows 64 and 65, are respectively formed in areas bounded by either the through holes 60 and 62 or the through holes 61 and 63 which are to be relatively large bonding areas through hole 66 is formed in a central area that is bounded by the through holes 60 and 61; and cutaway portions 67 and 68 are respectively formed at the two sides of the film 33 that are opposite the soldered portion between the actuator unit 1 and the flexible cable 15. In FIG. 3, reference number 69 is used to denote positioning holes through which pins used in a positioning jig can be inserted.

Since the thermally fusible film 33 must be able to bond together materials whose properties are different, for example, the ink supply port forming substrate 21 that is formed of metal and the actuator unit 1 that is formed of ceramics, when compared with the thermally fusible films 31 and 32, which are used to bond together the ink supply port forming substrate 21, the common ink chamber forming substrate 25 and the nozzle plate 27 that respectively are made of metal and that form the flow path unit 30, the thermally fusible film 33 has a different composition. That is, in the thermally fusible film 33, synthetic rubber is added to polyolefin, so that it is able to bond the metal and ceramic to each other and has a high bonding strength.

A description will now be given below of a method for fixing the respective components to one another using the above-mentioned thermally fusible films 33, 31 and 32.

Figure 4:
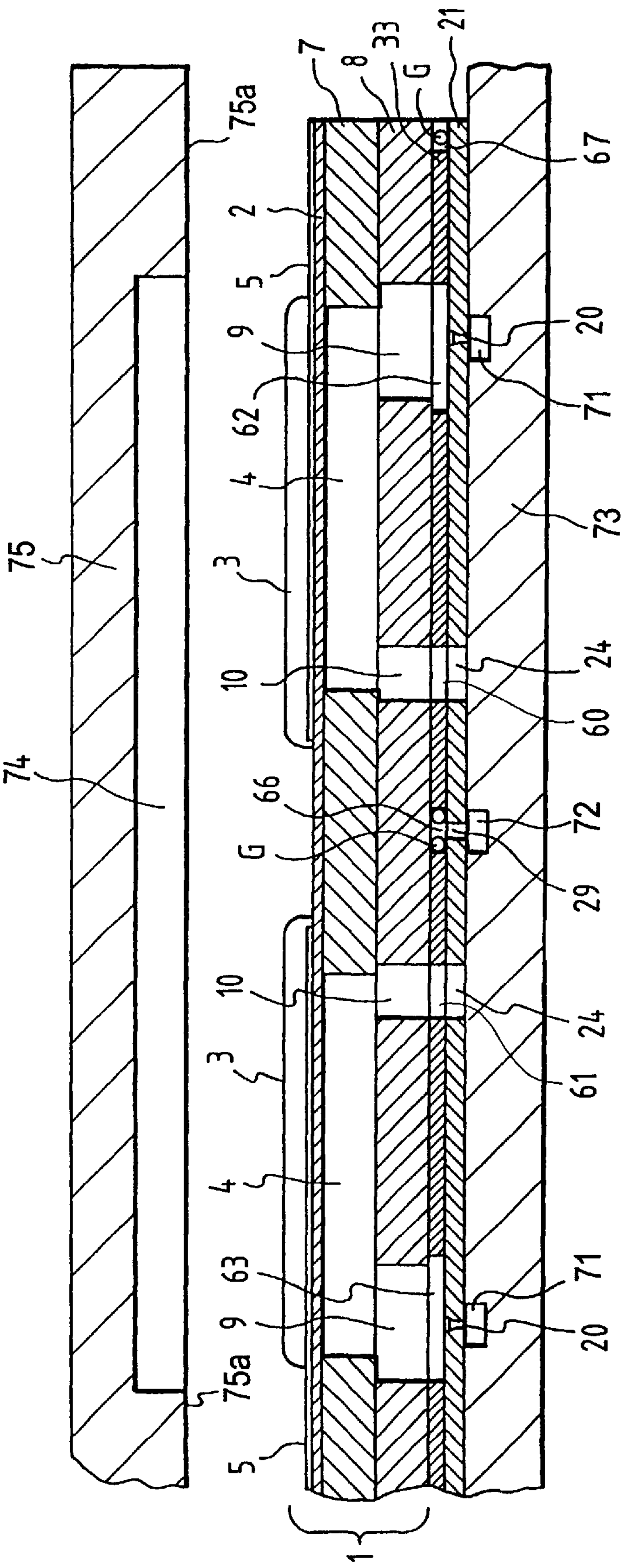
FIG. 4 is a cross sectional view of the embodiment, showing how to fix the ink supply port forming substrate of the flow path unit and the actuator units to each other.

The ink supply port forming substrate 21 is positioned by using positioning pins (not shown) in a heating substrate 73 that, as is shown in FIG. 4, includes recessed portions 71 and 71 that are formed at locations that are opposite the ink supply ports 20 and 20 in the ink supply port forming substrate 21, and that also includes a recessed portion 72 that is formed at a location opposite the air deflating through hole 29 in such a manner that the recessed portion 72 is open to the air.

After that, as is shown in FIG. 3, the thermally fusible films 33, 33, 33 are respectively positioned on the surface of the ink supply port forming substrate 21 and are provisionally bonded thereto, and, at the same time, an adhesive P, which is composed of epoxy-system synthetic resin that is mixed with a gap material G, such as beads, or the like, having a diameter D that provides the thickness of the thermally fusible film 33 after it is fused, is applied discretely to the windows 64sand cutaway portions 67 and 68 of the thermally fusible film 33.

It is preferable that the diameter D of the gap material G be smaller than a maximum thickness Tmax of the adhesive layer, such as the thermally fusing film 31 and be greater than the maximum warped amount Rmax of the actuator unit 1, i.e., be a value of:

$$T\max > D > R\max,$$

so that the curving of the actuator unit 1 to a degree is permitted and the constant thickness of the adhesive layer can be maintained.

The actuator unit 1 is positioned on the surface of the thermally fusible film 33, and, while they are being compressed by the heating substrate 73 and the projecting portion 75*a* of a pressure plate 75, which has a recessed portion 74 that is formed in an area that is opposite the piezoelectric vibration plates 3, 3, the temperature of the heating substrate 73 is increased to 160° C. or so.

In this heating process, the thermally fusible film 33 is softened and fused, so as to bond the ink supply port forming substrate 21 and the actuator unit I to each other. In this bonding, the portions where the windows 64 and the cutaway portions 67 and 68 are formed are filled with the gap material G to prevent the excessive compression of the thermally fusible film 33 and to thereby prevent the uneven extrusion of the thermally fusible film 33.

As the unnecessary extrusion is prevented in the above described manner, the possibility that the thermally fusible film 33 having an uneven thickness will be interposed between the actuator unit 1 and the ink supply port forming substrate 21 will be eliminated, and ensures that a sufficient bonding strength can be obtained. Also, this keeps the fused film from overflowing into the communication holes 24 and the ink supply ports 20, thus preventing the communication holes 24 and the ink supply ports 20 from being closed by the fused film, and at the same time prevents the flow path resistance from increasing.

Also, in this heating process, although the air expands in the windows 66 that are formed to receive an extruded quantity of the thermally fusible film 33, since the air is discharged from the air deflating through holes 29 of the ink supply port forming substrate 21 into the recessed portions 72 and is than discharged to the outside through the recessed portion 72, the possibility is eliminated that the air will remain between the ink supply port forming substrate 21 and the actuator unit 1.

This prevents an air layer from being formed between either the thermally fusible film 33 and the ink supply port forming substrate 21 or the second cover member 8. This in turn prevents the thermally fusible film 33 from being unnecessarily deformed due to the thermal expansion of the air layer, and prevents the bonding strength from being lowered due to the thermal expansion of the air layer. In other words, if an air layer is produced between the ink supply port forming substrate 21 and the second cover member 8, then the air layer will cause the substrate 21 and the cover member 8 to be flexibly deformed in part, so that they assume an uneven shape.

In the above mentioned embodiment, in order to enhance the bonding strength between metal and ceramics, which have different properties, a film that is composed of polyolefin mixed with synthetic rubber is used as the thermally fusible film 33. In this instance, in view of the fact that synthetic rubber can cause some kinds of inks to soften, it is desirable that synthetic rubber not be contained in the thermally fusible film. However, if synthetic rubber is not contained in the thermally fusible film, then there is a fear that, when two different kinds of materials such as ceramics and metal are bonded to each other, the bonding strength between them will be lowered.

Therefore, in order to obtain a sufficiently strong bond between metal and ceramics with a polyolef in film that does not contain synthetic rubber, in some cases, a method must be employed in which the thermally fusing temperature is increased to 180° C. or so, so as to soften and fuse the thermally fusible film 33 sufficiently before the metal and ceramics can be bonded to each other.

Even when metal and ceramics are bonded at the raised temperature in this manner, it is possible to remove the air in the windows formed in the thermally fusible film 33 by means of the through holes 29 that are formed in the ink supply port forming substrate 21. This prevents the air from remaining on the bonded surface, and permits metal and ceramics to be bonded to each other with a uniformly thick bonded layer, with a high ink resistance, and with a high bonding strength.

On the other hand, as a result of polyolefin film being fused at a high temperature of 180° C. or so, if a gap material G having a diameter of 18 μm is used, then a polyolefin film having a thickness of 30 μm before bonding can be spread and reduced to a thickness on the order of 10 μm to 20 μm after bonding, which is the minimum thickness that is required to secure the required bonding strength.

Because of this, the thickness of the thermally fusible film 33 to be exposed in the areas of the flow path unit 30 and the actuator unit 1 through which the ink flows, that is, the through holes 9 and 10, can be reduced to a thickness of approximately 10 μm to 20 μm, and therefore, even if the thermally fusible film is formed of polyolefin having a low wettability, it is possible to prevent the attachment of air bubbles to the bonded surface.

In other words, it is generally known that even with material that is low in wettability and to which air bubbles are easily attached, if the minimum thickness of the surface of the material is smaller than the radius of air bubbles, the air bubbles can not remain on the surface of the bonded material.

On the other hand, if the vapor pressure of a solvent is expressed as Pv, the surface tension of ink as T, and the radius of the air bubbles as R, then the following known relationship exists:

$$Pv>2T>R.$$

When this relationship is applied to a typical type of ink having a vapor pressure Pv=3168Pa and a surface tension T=52 mN/m, an air bubble that is generated in the ink has a radius of 33 μm or less. Therefore, if the thickness of the thermally fusible film 33 after bonding is controlled so that it is 30 μm or less, preferably, of the order of 10 μm to 20 μm, then it is possible to prevent the air bubble from remaining in the through holes 9 and 10.

Figure 5:
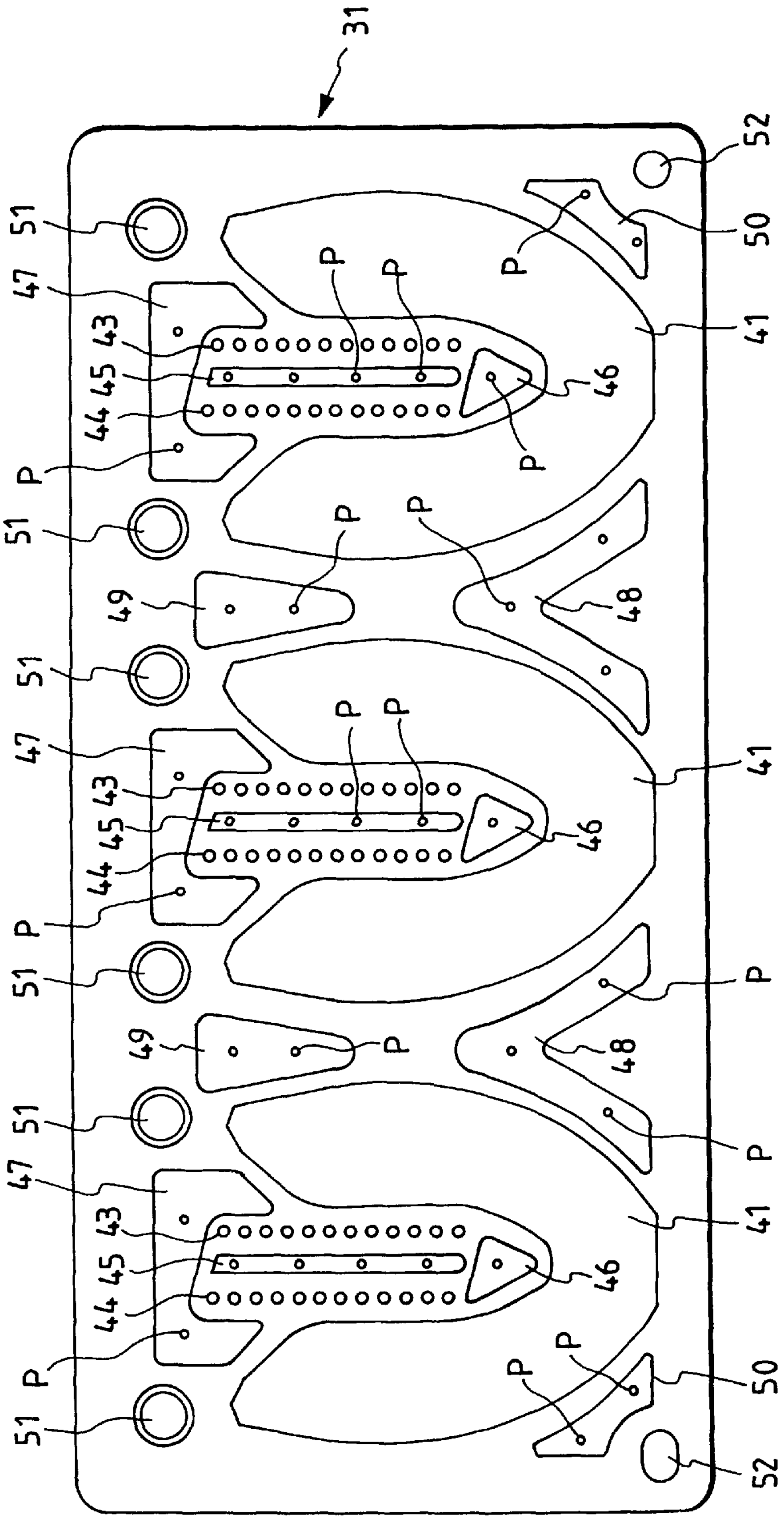
FIG. 5 is an illustration for an embodiment in which a thermally fusible film is used to bond the ink supply port forming substrate of the flow path unit and a common ink chamber forming substrate to each other.
Figure 6:
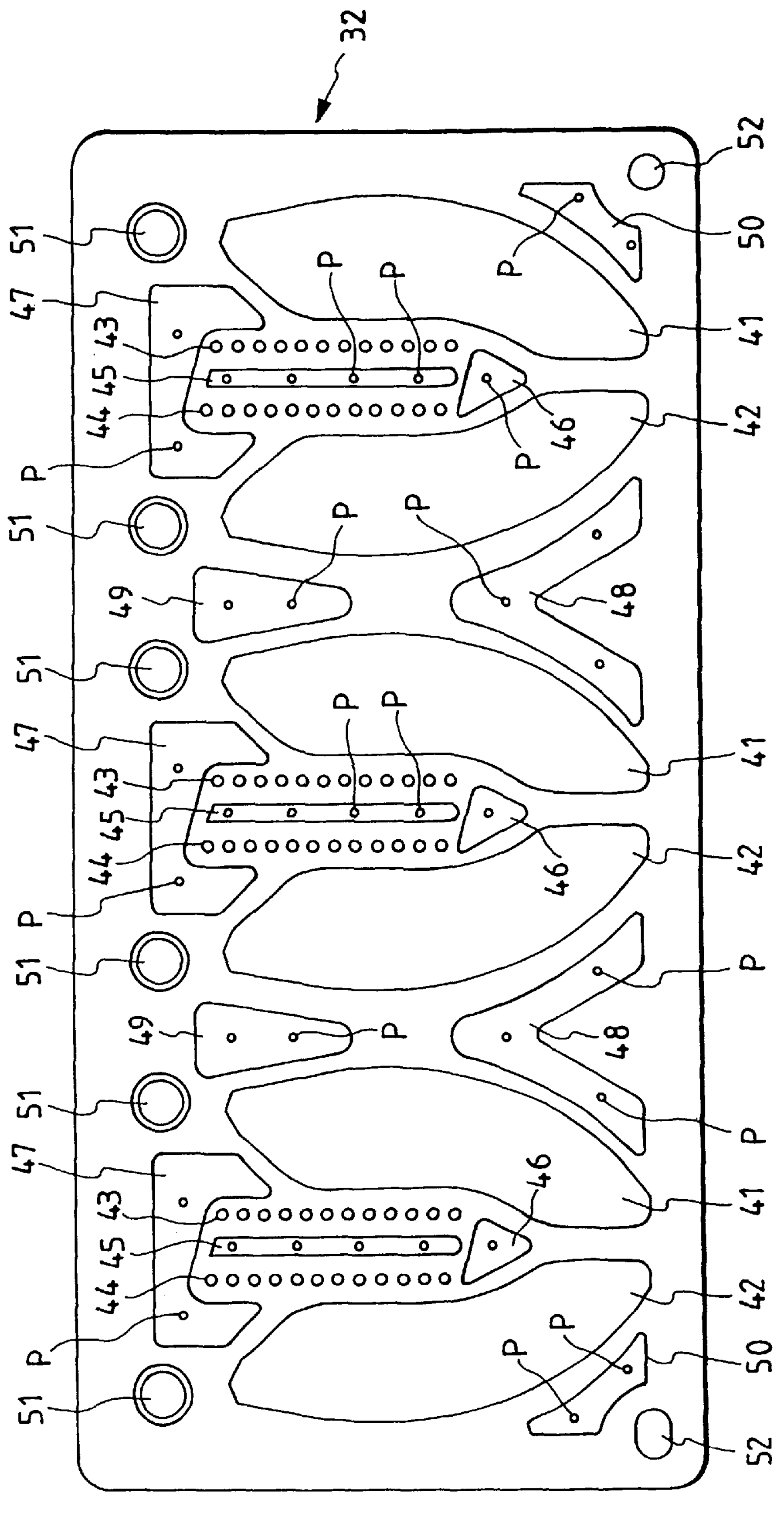
FIG. 6 is an illustration for an embodiment in which a thermally fusible film is used to bond the common ink chamber forming substrate of the flow path unit and a nozzle plate to each other.

FIG. 5 is an illustration for an embodiment in which the thermally fusible film 31 is used to connect and bond together the ink supply port forming substrate 21 and the common ink chamber forming substrate 25, which constitute the above mentioned flow path unit 30; while FIG. 6 is an illustration for an embodiment in which the thermally fusible film 32 is used to fix the common ink chamber forming substrate 25 and the nozzle plate 27 to each other. In the areas of the thermally fusible films 31 and 32 that are opposite the common ink chambers 23, are formed windows 41 and 42, each of which has a shape corresponding to the shape of the common ink chamber 23. Ashape, that is, which at the least prevents the thermally fusible films from overflow into tho common ink chamber side. Also, in the areas of the thermally fusible films 31 and 32 that are opposite the nozzle openings 28, through holes 43 and 43 are formed in such a manner that they correspond to the communication holes 24 of the ink supply port forming substrate 21 and the communication holes 26 of the common ink chamber forming substrate 25.

And between the through holes 43 and 44 which are located opposite two lines of nozzle openings that belong to one actuator unit 1, there is formed a long, narrow rectangular window 45.

In the areas of the thermally fusible films 31 and 32 that are bounded by the two windows 41 and 42, which belong to one actuator unit 1 and which are in the fused and bonded area and are comparatively large, are formed windows 46 and 47. Also, in the comparatively large portions of the fused and bonded area in which the actuator units 1 can contact each other, are formed windows 48 and 49. And in the comparatively large portions of the fused and bonded areas that are situated adjacent to the end portions of the films, there are formed windows 50.

These low thermally fusible films 31 and 32 are substantially, identically shaped. However, in the thermally fusible film 31, the portion thereof that is opposite the ink guide ports 22 is cutaway, so that the windows 41 and 42 are rendered contiguous, and together form a single window.

In the diagram, reference number 51 is used to denote positioning holes into which pins can be inserted for positioning the thermally fusible film with respect to the actuator unit, while reference number 52 is used to denote positioning holes into which pins 92 and 83 (FIG. 7) can be inserted for positioning the respective components 21, 25 and 27 of the flow path unit 30.

Now, a description will be given below of a process by which to form a flow path unit, in which the common ink chamber forming substrate 25 and the nozzle plate 27 are bonded to the ink supply forming substrate 21, and the actuator unit 1 is bonded thereto by using one of the above mentioned thermally fusible films 31 and 32.

Figure 7:
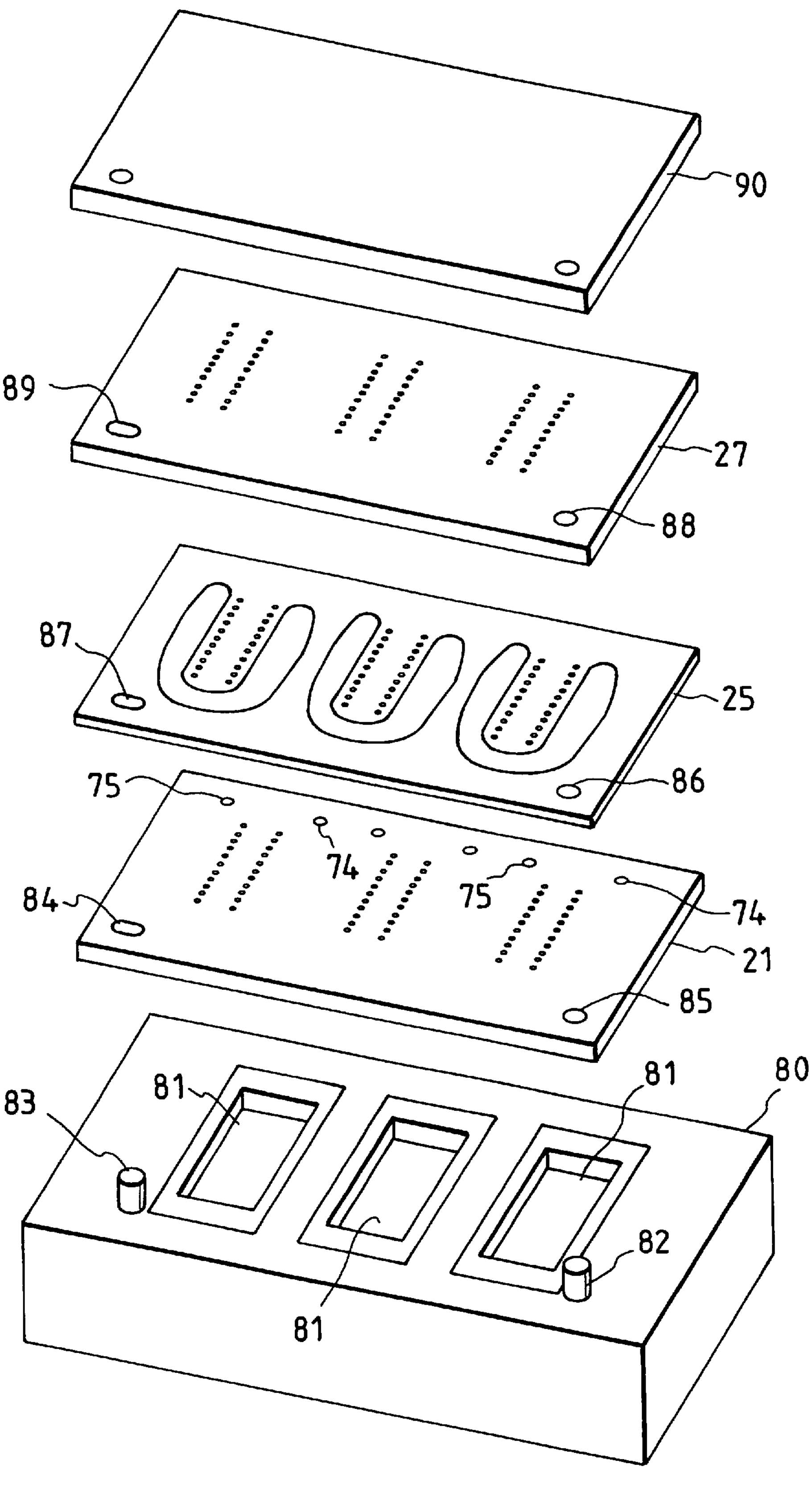
FIG. 7 is an illustration for an embodiment showing a method for bonding together the components of the flow path unit.

FIG. 7 shows an embodiment of a jig that is used to assemble the flow path unit 30. In FIG. 7, reference number 80 denotes the above jig, which includes recessed portions 81, 81, 81 that are formed in the respective areas that are opposite the piezoelectric vibration plates 3, 3, 3 and which also includes positioning pins 82 and 83.

In the above process, the positioning holes 84 and 85 of the ink supply port forming substrate 21, to which the actuator units 1, 1, 1 are fixed, are respectively engaged by the positioning pins 83 and 82. The actuator units 1, 1, 1 provide the lower surface of the substrate 21, so that the ink supply port forming substrate 21 can be set on the jig 80.

Next, the thermally fusible film 31 is provisionally bonded to the ink supply port forming substrate 21 on the side opposite the common ink chamber forming substrate 25, and the adhesive P, which is composed of epoxy-system synthetic resin and is mixed with the gap material such as beads or the like, is discretely applied to the rectangular window 45 as well as to the windows 47, 48 and 50. After that, the common ink chamber forming substrate 25 is positioned by engaging the positioning holes 86 and 87 with the positioning pins 82 and 83, and is then superimposed on the ink supply port forming substrate 21.

Following this, a thermally fusible film 32 is provisionally bonded to the nozzle plate 27 on its side that faces the common ink chamber forming substrate 25 after it is superimposed, and the interior of the rectangular windows 45 and the windows 47, 48 and 50 are coated with the adhesive P that is composed of the epoxy-system synthetic resin and is mixed with the gap material such as beads or the like. After that, the nozzle plate 27 is superimposed on the common ink chamber forming substrate 25 by engaging the positioning holes 88 and 89 with the pins 82 and 83.

In this condition, the respective thermally fusible films 31 and 32 are heated to a temperature of 160° C., which can soften and fuse these films,/while pressure is applied to the films 31and 32 by a keep plate 90. In this fashion, the ink supply port forming substrate 21, the common ink chamber forming substrate 25, and the nozzle plate 27 are bonded is together by the thermally fusible films 31 and 32. That is, they are united with the actuator units 1, 1, 1, which were bonded together at the previous step, to provide an ink jet recording head.

In this bonding process, the gap materials G that are deposited in the rectangular through holes 45 and the windows 47, 48, 49 and 50 prevent the excessive spreading out of the thermally fusible films 31 and 32 and thereby eliminate the possibility of the communication holes 24 and 26 producing uneven shapes, of the communication holes 24 and 26 being closed by the fused and extruded film material, and of the fused film material overflowing into the common ink chamber 23 side.

At this step, in which the recording head main body is so formed, the flexible cable 15 is soldered to the drive electrodes 5, 5, 5, . . . . However, because the cutaway portions 67 and 68 (FIG. 3) are formed in the areas of the thermally fusible film 33 that are opposite the soldered portion 16, that is, the two end portions of the film 33, the thermally fusible film 33 is protected as much as possible from receiving a high heat on the order of 300° C. that results from the soldering. This eliminates the possibility of the position of the thermally fusible film 33 being shifted due to the irregular expansion and compression that are caused by a re-fusion at a high temperature of the thermally fusible film 33 and its cooling after the re-fusion, and of the through holes of the thermally fusible film 33 being deformed after the fused bonding.

Figure 8A:
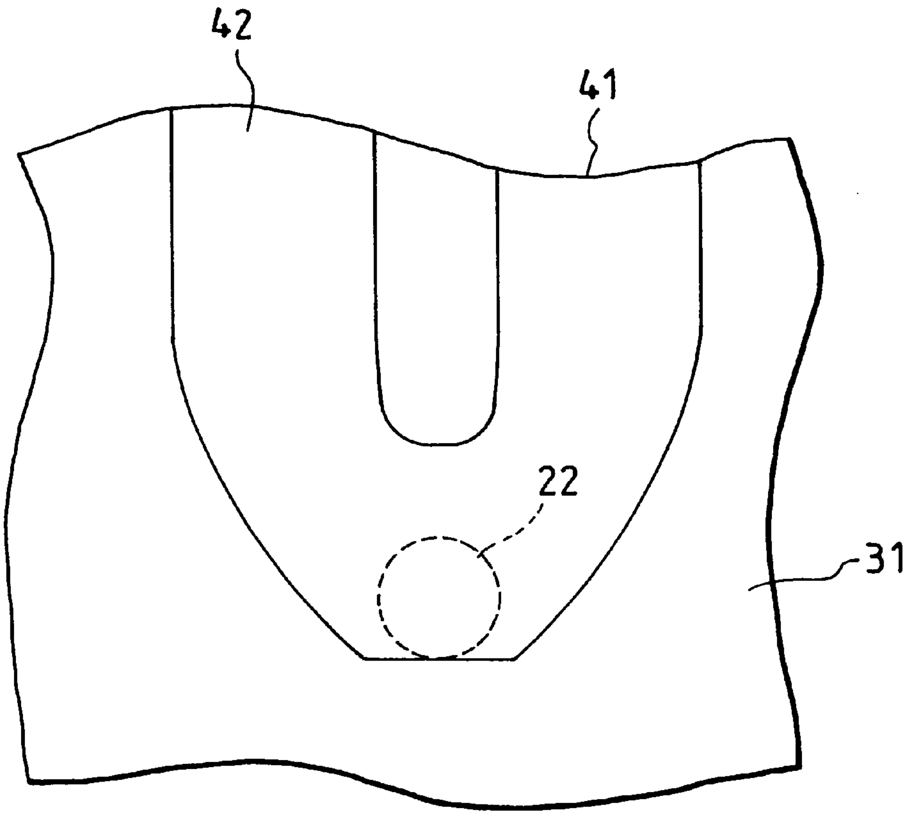
FIGS. 8(*a*) and (*b*) are cross sectional views of the present recording head, respectively showing a positional relationship between an ink guide port and a window that is formed in the thermally fusible film, and the structure of a portion of the present recording head that is located adjacent to the ink guide port.
Figure 8B:
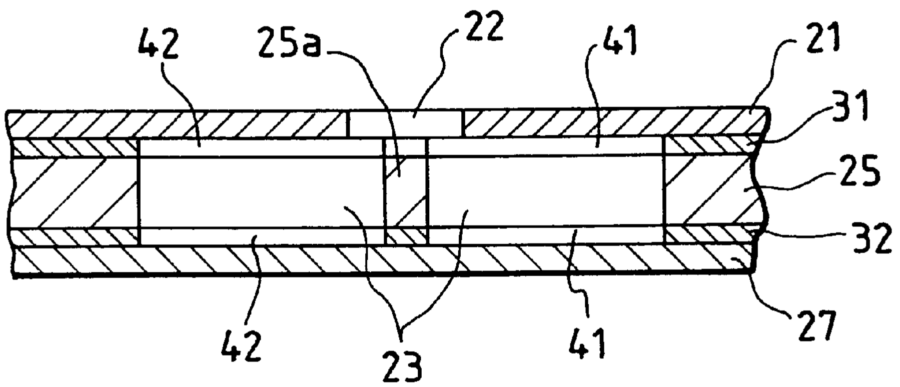

Also, as is shown in FIG. 8(*a*), even if there is employed a structure in which a divider 25*a* is formed in the portion of the ink chamber forming substrate 25 that is opposite the ink guide port 22, so as to thereby position an ink supply tube that is to be connected to the ink guide port 22 and to strongly secure the ink supply tube, since the thermally fusible polyolefin film 31, for bonding the ink supply port forming substrate 21 and the common ink chamber forming substrate 25 to each other, is not exposed to the area of the film 31 that is opposite the ink guide port 22, the thermally fusible film 31 is kept from contacting ink in this area, and air bubbles are thereby prevented from remaining there.

Figure 9:
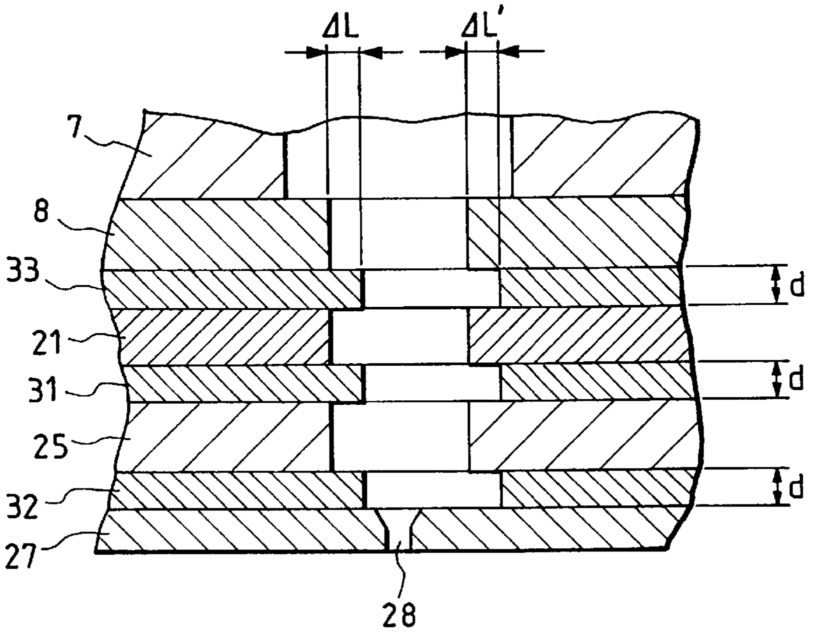
FIG. 9 is a view of a relationship between the thickness, the overflow amount, and the compression amount of a thermally fusible film that is exposed to an ink flow path.
Figure 10:
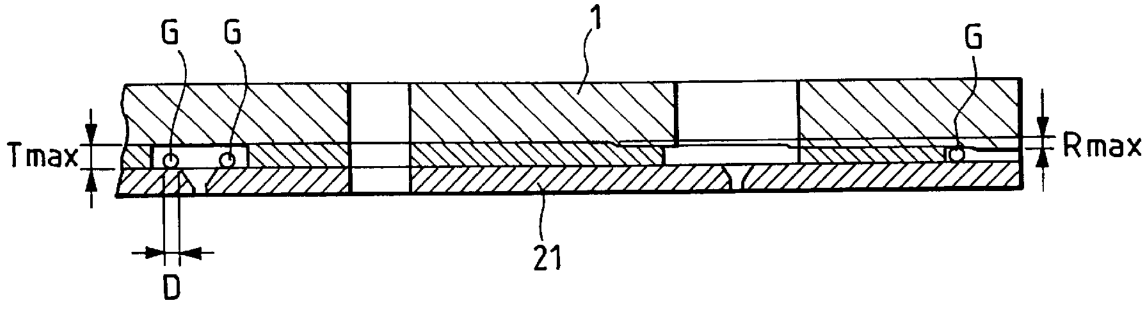
FIG. 10 is a view of a relationship between the diameter of a gap material, the warped amount of the actuator unit, and the thickness of the adhesive.

As is described above, because a thermally fusible film that is composed of polyolefin or the like can prevent air bubbles from remaining in a portion when the area that is in contact with ink is 30 μm or less, not only the thickness Ad of the thermally fusible films 31, 32 and 33 after the fused bonding, but also the amount of overflow ΔL into the flow path and the recessing amount ΔL' (FIG. 9) can be respectively controlled down to 30 μm or less, air bubbles can be prevented from attaching to the thermally fusible films 33, 32 and 31, which constitute part of the flow path, and the air bubbles in the flow path can be removed quickly.

The amount of overflow of the thermally fusible films 31, 32 and 33 that is caused by their extrusion during the thermally fused bonding, greatly depends on the flatness of the members that are to be bonded. If the degree of flatness is 5 μm or less, then the amount of the overflow of the thermally fusible films 31, 32 and 33 can be respectively controlled down to 30 μm or less.

For this reason, in the present embodiment, the second cover member 8 of the actuator unit, and the ink supply port forming substrate 21, ink chamber forming substrate 25 and nozzle plate 27 of the flow path forming unit 30, which are to be bonded to one another by the thermally fusible films 31, 32 and 33, are so finished such that the degree of flatness of their respective surfaces that are to be bonded are respectively 5 μm or less.

In the illustrated embodiment, one surface of the spacer 7 is sealed by the second cover members 8. However, the embodiment is not thereby so limited, and alternatively, the surface of the spacer 7 can be fixed directly to the ink supply port forming substrate 21 without using the second cover members 8, so that it is clear that another, similar operation can be provided.

Figure 11:
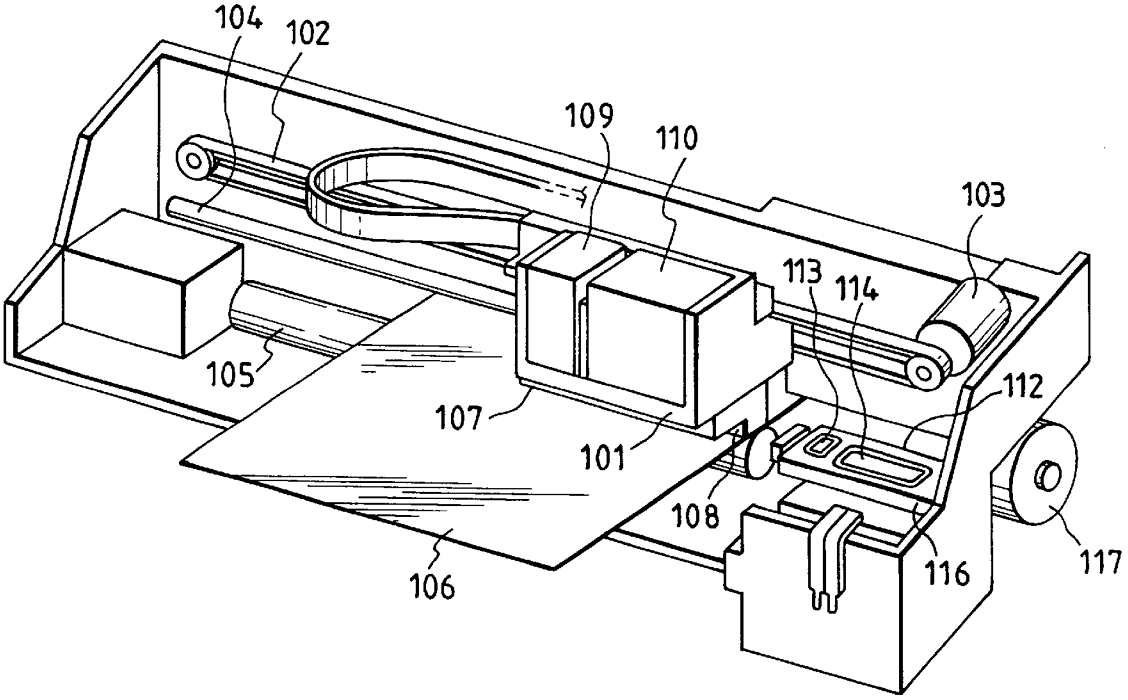
FIG. 11 is a diagram illustrating one embodiment of a color recording apparatus that employs the recording head of the present invention.

FIG. 11 shows one embodiment of a recording apparatus that employs the above described ink-jet recording head. Reference number 101 denotes a carriage, which is connected by a timing belt 102 to a carriage drive motor 103 and which reciprocally moves along a guide member 104 in parallel to a platen 105.

On a face of the carriage 101, which is opposite a recording sheet 106, is provided a recording head 107 through which black ink is ejected onto a print area (left side in the diagram), and a recording head 108 for color printing is mounted on the non-print area. Ink is supplied from a black ink cartridge 109 and a color ink cartridge 110 to the recording heads 107 and 108, and through them, ink droplets are ejected onto the recording sheet 106 for printing.

The recording head 107 through which black ink is ejected is so designed that one unit of the above described actuator unit 1 is fixed to the flow path unit 30, which has a required number of nozzles. The recording head 108 through which color ink is ejected is so designed that three of the above actuator units are fixed to the flow path unit 30, which are used in common.

Even though the recording head 108 through which color ink is ejected has three installed units, it can function as a highly reliable recording head because the extruded quantity of the thermally fusible film is received at the communication holes that are provided at predetermined positions in that film, and the unnecessary dispersion of the thermally fusible film is prevented by the gap material with which the communication holes are filled.

Reference number 112 denotes a capping device, wherein a cap member 113 for sealing the black ink recording head 107 and a cap member 114 for sealing the color ink recording head 108 are mounted on a single slider and are connected by a tube to a pump unit 116 that has two continuous tube pumps.

The cap members 113 and 114, which are cup-shaped and are composed of an elastic material, such as rubber, are large enough to seal the nozzle opening faces of the recording heads 107 and 108 within the same space. The cap members 113 and 114 close the nozzle openings of the recording heads 107 and 108 when printing is not being performed. When a discharge capacity is to be recovered, loads are applied to the recording heads 107 and 108 by the pump unit 116 that receives its driving force from a motor 117, which drives a paper feed roller (not shown), so that ink is so impelled and is ejected through the recording heads 107 and 108.

As has been described heretofore, according to the present invention, an ink supply port forming substrate, a common ink chamber forming substrate, and a nozzle plate are bonded together by inserting between them a thermally fusible films, in each of which are formed through holes at two or more positions, and by filling the film through holes with an adhesive that is mixed with a gap material for adjusting the thickness of the thermally fusible films when they are fused, so as to thereby forming a flow path unit; and the flow path unit and the actuator units are bonded together by inserting between them thermally fusible film, in which are formed through holes formed at two or more positions, and by filling the through holes with the adhesive that is mixed with the gap material for adjusting the thickness of the thermally fusible film when it is fused, so that an extruded quantity of the thermally fusible film can be received by the through holes that are formed in the proper positions in the thermally fusible films, and so that the unnecessary spreading out of the thermally fusible film can be prevented by the gap materials that are applied in the through holes in the thermally fusible film. Thus, the thicknesses of the bonded layers can be controlled down to a given level, while the thicknesses of the thermally fusible film layers that are exposed to the communication holes can be made uniform. This prevents the nozzle openings and the communications holes from being closed, and prevents the effective sectional area from being reduced.

What is claimed is:

1. A method for manufacturing a laminated ink-jet recording head, comprising steps of;

fixing an actuator unit to a first surface of an ink supply port forming substrate by employing a first thermally fusible non-metallic film;

fixing a common ink chamber forming substrate to a second surface of said ink supply port forming substrate by employing a second thermally fusible non-metallic film; and fixing a nozzle plate to a surface of said common ink chamber forming substrate by employing a third thermally fusible non-metallic film wherein said first, second and third thermally fusible non-metallic films have windows therein, at areas other than areas to be an ink flow passage defined by laminating said actuator unit, said common ink chamber substrate, and said nozzle plate.

2. The method of claim 1, further comprising steps of:

supplying an adhesive mixed with a gap material into the windows in said first, second and third thermally fusible non-metallic films; and fusing said first, second and third thermally fusible non-metallic films whereby a thickness of each of said first, second and third thermally fusible non-metallic films is substantially constant, and communication holes in said ink supply port forming substrate and said common ink chamber forming substrate are not closed by said first, second and third thermally fusible non-metallic films.

3. The method of claim 2, wherein a diameter of the gap material is smaller than a maximum thickness of said adhesive.

4. The method of claim 2, further comprising the step of discharging expanded air from air deflating holes formed in said ink supply port forming substrate into recessed portions formed in a heating substrate, thereby preventing air from remaining between said ink supply port forming substrate and said actuator unit which prevents deformation of said first thermally fusible film.

5. The method of claim 2, further including the step of supplying said adhesive in windows formed in said ink supply port forming substrate and in said common ink chamber forming substrate.

6. The method of claim 2, further including the step of forming a divider in a portion of said ink chamber forming substrate that is opposite to an ink guide port formed in said ink supply port forming substrate, whereby said second thermally fusible film is not exposed to an area opposite to said ink guide port.

7. The method of claim 2, wherein the ink supply port forming substrate, the ink chamber forming substrate and the nozzle plate have a degree of flatness of 5 $\mu$m or less.

8. The method of claim 1, wherein the first thermally fusible non-metallic film made of synthetic rubber and polyolefin.

9. The method of claim 1, further including a step of applying said adhesive to windows and cutaway portions formed in said first thermally fusible non-metallic film.

10. The method of claim 1, further comprising a step of softening and fusing said first thermally fusible non-metallic film before said step of fixing the actuator unit to the ink supply port forming substrate.

11. The method of claim 1, wherein a thickness of said first thermally fusible non-metallic film is less than 30 $\mu$m.

12. The method of claim 1, wherein the through holes formed in said second and third thermally fusible films correspond to communication holes of said ink supply port forming substrate, and to communication holes formed in said common ink chamber forming substrate.

13. A method for manufacturing a laminated ink-jet recording head, comprising steps of:

fixing an actuator unit to a first surface of an ink supply port forming substrate by employing a first thermally fusible film;

fixing a common ink chamber forming substrate to a second surface of said ink supply port forming substrate by employing a second thermally fusible film;

fixing a nozzle plate to a surface of said common ink chamber forming substrate by employing a third thermally fusible film wherein said first, second and third thermally fusible films have windows therein, at areas other than areas to be an ink flow passage defined by laminating said actuator unit, said common ink chamber substrate, and said nozzle plate;

supplying an adhesive mixed with a gap material into the windows in said first, second and third thermally fusible films; and fusing said first, second and third thermally fusible films whereby a thickness of each of said first, second and third thermally fusible films is substantially constant, and communication holes in said ink supply port forming substrate and said common ink chamber forming substrate are not closed by said first, second and third thermally fusible films.

14. The method of claim 13, wherein the first thermally fusible film is made of synthetic rubber and polyolefin.

15. The method of claim 13, further including a step of applying said adhesive to windows and cutaway portions formed in said first thermally fusible film.

16. The method of claim 13, wherein a diameter of the gap material is smaller than a maximum thickness of said adhesive.

17. The method of claim 13, further comprising a step of softening and fusing said first thermally fusible film before said step of fixing the actuator unit to the ink supply port forming substrate.

18. The method of claim 13, wherein the thickness of said first thermally fusible film is less than 30 $\mu$m.

19. The method of claim 13, wherein the ink supply port forming substrate, the ink chamber forming substrate and the nozzle plate have a degree of flatness of 5 $\mu$m or less.

* * * * *